United States Patent
Olesen et al.

(10) Patent No.: US 6,741,912 B2
(45) Date of Patent: May 25, 2004

(54) FLEXIBLE TOOL FOR HANDLING SMALL OBJECTS

(75) Inventors: Tom Olesen, Gørløse (DK); Søren Olesen, Gørløse (DK); Henrik Andersen, Værløse (DK); Preben Damgård Jensen, Birkerød (DK)

(73) Assignee: Microbotic A/S, Gørløse (DK)

( * ) Notice: Subject to any disclaimer, the term of this patent is extended or adjusted under 35 U.S.C. 154(b) by 11 days.

(21) Appl. No.: 10/183,559

(22) Filed: Jun. 28, 2002

(65) Prior Publication Data

US 2003/0017032 A1 Jan. 23, 2003

Related U.S. Application Data

(60) Provisional application No. 60/301,837, filed on Jul. 2, 2001.

(51) Int. Cl.[7] .......................................... G05B 19/418
(52) U.S. Cl. ................. 700/248; 700/188; 700/189; 700/245; 700/254; 701/23; 414/226.01; 180/8.1; 74/490.06; 901/29; 606/57; 33/645
(58) Field of Search ................. 700/248, 188, 700/245, 254; 701/23, 27; 414/226.01, 935, 735; 180/8.1, 8.6; 702/150, 91, 105, 113, 33, 44, 85, 94; 74/490.06, 479.01, 490.08, 490.07; 901/28; D33/645; 606/57; 409/201, 211, 216, 235

(56) References Cited

U.S. PATENT DOCUMENTS

| | | | |
|---|---|---|---|
| 4,536,690 A | * 8/1985 | Belsterling et al. | 318/687 |
| 4,753,569 A | 6/1988 | Pryor | |
| 5,388,935 A | 2/1995 | Sheldon | |
| 5,428,446 A | * 6/1995 | Ziegert et al. | 356/493 |
| 5,797,191 A | * 8/1998 | Ziegert | 33/503 |
| 5,813,287 A | * 9/1998 | McMurtry et al. | 74/490.06 |
| 5,901,936 A | * 5/1999 | Bieg | 248/370 |
| 5,909,939 A | * 6/1999 | Fugmann | 33/503 |
| 5,931,098 A | * 8/1999 | Bates | 101/484 |
| 6,004,016 A | 12/1999 | Spector | |
| 6,024,526 A | 2/2000 | Slocum et al. | |
| 6,086,283 A | * 7/2000 | Ziegert | 403/57 |
| 6,099,217 A | * 8/2000 | Wiegand et al. | 409/201 |

(List continued on next page.)

FOREIGN PATENT DOCUMENTS

| | | |
|---|---|---|
| JP | 11090867 | 4/1999 |
| JP | 11090869 | 4/1999 |
| WO | WO 01/19272 A2 * | 3/2001 |
| WO | WO 02/34461 A2 * | 5/2002 |
| WO | WO 03/004222 A2 * | 1/2003 |

OTHER PUBLICATIONS

Stankoczi, Development of a new parallel kinematics machine tool, 1999, Internet, pp. 147–154.*

Arai et al., "Calibration and Basic Motion of a Micro Hand Module," Int. Conf. on Indus. Electronics, Control and Instrumentation (IECON), Nov. 15–19, 1993, pp. 1660–1665.

*Primary Examiner*—William A. Cuchlinski, Jr.
*Assistant Examiner*—McDieunel Marc
(74) *Attorney, Agent, or Firm*—Birch, Stewart, Kolasch & Birch, LLP (57) ABSTRACT

A flexible tool for handling small objects, as well as a method for handling small objects using the flexible tool. The flexible tool comprises one or more mini robots, such as a free arm robot and one or more hexapod(s) working in an internal workspace when performing operations on small objects. Furthermore, an external space can be used for storing the objects during non-operation. The hexapods are to engage with a small object and to move a small object between the internal workspace and the external space, and the free arm robot is to move one or more hexapod(s). Fast measurements of robot positions are included, the measurements being feed back to a computer system controlling the mini robots. The computer system further comprises vision and motion planning.

33 Claims, 8 Drawing Sheets

U.S. PATENT DOCUMENTS

| | | | |
|---|---|---|---|
| 6,145,405 A | * 11/2000 | McMurtry et al. | 74/490.07 |
| 6,155,758 A | * 12/2000 | Wieland et al. | 409/201 |
| 6,223,604 B1 | * 5/2001 | Fronczak et al. | 73/856 |
| 6,241,437 B1 | * 6/2001 | Wieland | 409/201 |
| 6,336,375 B1 | * 1/2002 | McMurtry et al. | 74/490.07 |
| 6,354,168 B1 | * 3/2002 | Schwaar et al. | 10/183.559 |
| 6,497,548 B1 | * 12/2002 | Roy et al. | 414/735 |
| 6,503,033 B1 | * 1/2003 | Kim et al. | 409/201 |
| 6,587,802 B1 | * 7/2003 | Schroder et al. | 702/91 |
| 6,602,042 B2 | * 8/2003 | Roy et al. | 414/735 |
| 2002/0010465 A1 | * 1/2002 | Koo et al. | 606/57 |
| 2002/0029610 A1 | * 3/2002 | Chrystall et al. | 73/7 |
| 2002/0117017 A1 | * 8/2002 | Bernhardt et al. | 74/471 XY |
| 2003/0106230 A1 | * 6/2003 | Hennessey | 33/645 |

* cited by examiner

FLEXIBLE TOOL FOR HANDLING SMALL OBJECTS

This application claims the benefit of Provisional Application No. 60/301,837 field Jul. 2, 2001.

FIELD OF THE INVENTION

The present invention relates to a flexible tool for handling small objects, as well as a method for handling small objects using the flexible tool. The flexible tool comprises one or more mini robots, fast measurements of robot positions and feed back to a computer system controlling the mini robots. The computer system further comprises vision and motion planning.

BACKGROUND OF THE INVENTION

In connection to the increasing miniaturising of almost all high-tech products, handling of small components is getting increasingly important. Many modern high-tech products comprise one or more very small components. There are in general two ways of producing products with very small parts.

One is to make the assembly by hand using a microscope and special handheld tools. Hand held assembly is prone to human errors, and furthermore it is expensive. Due to the cost, human assemblies are often made in countries with low salaries and this seldom has a positive effect on the yield. Furthermore, only smaller numbers of products may be produced in this way.

Another possibility is to construct an assembly machine dedicated to do the task—or one of several tasks. A special machine is rather expensive, and therefore only an option if it is used for high-volume production. It may be very difficult or even impossible to change to new demands when the product or market chances. Furthermore, the time from a new special assembly tool is required to it may be ready for use could easily be far to long. There is therefore a strong need for a possibility of producing small and medium sized number of products using a flexible tool. The tool should be easy to handle and fast to set up for new products.

When handling small components, it is usually very important to handle them with a high degree of precision. A standard robot can usually not handle and position components with a sufficiently high degree of precision. Standard robots use incremental decoders in each joint. Each of the encoders has certain accuracy, and the accuracy must be added to get the accuracy of the robot. When a component is to be picked up or positioned, the computer controlling the robot calculates the movements necessary for doing the task. However, due to the accuracy of the decoders, the calculated position may be several $10^{th}$ of millimetres off.

U.S. Pat. No. 6,024,526 discloses a unit for use in testing semiconductor components. The unit is designed to manipulate either packaged semiconductor components or semiconductor wafers and present them to a test head. The integrated unit includes a positioning mechanism with a tool plate that can be changed to grasp either a semiconductor wafer or a tray of semiconductor components. The tool plate uses a vacuum plate. To hold a tray of semiconductor parts, the vacuum plate has numerous independently operable holes. Each hole is positioned behind one semiconductor component and can be engaged or released separately so that the components can be sorted into separate output bins. To hold a wafer, the tool plate has an extendible tongue member that can be inserted into a stack of semiconductor wafers to pick up one wafer in the stack.

The use of vacuum for holding and moving components is less useful when the components are small, since the precision when picking up and when releasing small components is not sufficient. Furthermore, when using vacuum it is difficult to ensure that the orientation of the components is correct, when picking them up.

It is an object of the present invention to provide a flexible tool for handling small objects with a high degree of precision. The tool being capable of moving objects, positioning the objects at the required position and carrying out one or more operation(s) on the objects with high accuracy.

SUMMARY OF THE INVENTION

According to the present invention, the free-arm robot is used to move the hexapods. For this task, the accuracy is appropriate. When the hexapods are positioned in their docking stations, they are in a very stiff and good controlled environment, and the accuracy can therefore be very high. Furthermore, a telemetric system including vision by CCD-cameras provides real-time information regarding the progress of the handling of the components and feedback to the controller. In other words, the present invention combines the flexibility of the free-arm robot with the high accuracy of the fixed hexapods and real-time feedback from the vision system.

According to a first aspect of the present invention there is provided a flexible tool for handling small objects, the tool comprising:

a free arm robot,
at least one hexapod for handling small objects,
an internal workspace for performing operations on small objects, and
an external workspace for storing small objects during non-operation,
said at least one hexapod(s) being adapted to engage with a small object and to move a small object between said internal workspace and said external workspace, and said free arm robot being adapted to move the at least one hexapod(s).

According to a second aspect of the present invention there is provided a flexible tool for handling small objects, the tool comprising:

a conveyer belt,
at least one hexapod for handling small objects,
an internal workspace for performing operations on small objects, and
an external area for holding small objects during non-operation,
said conveyer belt being adapted to move a small object between said internal workspace and said external area and said at least one hexapod(s) being adapted to perform one or more operation(s) on said small object, when said small object is positioned within said internal workspace.

According to a third aspect of the present invention there is provided a method of handling small objects using a flexible tool, the method comprising the steps of:

moving one or more small object(s) to be handled from an external workspace to an internal workspace of the flexible tool using one or more hexapod(s),
performing operations on said small object(s) in the internal workspace using said hexapod(s).

The system platform is the base of the system. The platform comprises a cube and an external workspace each of which comprises docking stations for up to six hexapods. At each of the 12 docking stations a hexapod may be positioned and locked. When locked, the hexapod is connected to the main computer and to a power supply. A total of up to 11 hexapods may work at the same time in the system.

The platform further comprises six supply units for supplying components to be handled in the cube, or for storage of components that has already been handled. These components can be objects on which operations are carried out and can be tools to be used by the hexapods for carrying out these operations. At each of the supply units, a docking station is provided. The supply units may revolve so as to position new components within reach of the hexapod. The components are positioned with a know orientation in containers easily handled by the hexapod.

The floor of the cube may be one or more extra supply units, or it may be one or more conveyer belts or similar. The floor is adapted to move objects from outside the cube to a position inside the cube, where it may be handled by the hexapods.

A free-arm robot is positioned above the platform and connected to the platform in a stable manner. The robot may reach all the hexapods in any of the positions in the cube of the external workspace. It may move the hexapods from one position to another simply be selecting them and "snap-locking" them onto an adapter at the tip of the robot arm. When the hexapods is positioned at one of the docking stations, it is connected to a power supply and to the main computer by a number of data lines.

The system platform is made of a very stable and solid material, isolating the platform from most vibrations and other undesired environmental influences. The complete system is prepared for working in a clean-room environment.

The hexapod is construed as a slack-free construction with motors such as linear motors, step-motors, DC-motors with encoder, magnetic linear motors or hydraulic motors positioned outside the working area. The ball joint between the linear motor and the base plate is designed as spring forced ball resting on 3 angled surfaces, securing a determent positioning. This design allows the ball to have a large spherical diameter tolerance and still both have a smooth and slack free movement.

The flexible joint at the tool end of the hexapod is designed using a wire made from NiTi-alloy, better known as memory metal. This design is both simple and allows the joint, at the same time, to be both flexible and slack free.

The linear motor may be designed as an inchworm piezo motor. In this design the locking and moving piezo elements are separated parts. Use of the inchworm concept gives a design with no torque from the action of the motor, allowing a more simple design of the flexible joints of the hexapod. The separation of the locking and moving piezo elements makes it possible to design the motor so that it automatically locks the piston when the power is removed. This is an important feature in a system where the hexapods are moved without power from one position to another by a standard free-arm robot. Furthermore, the design of the motor allows the piston to be submitted to larger radial forces than the currently known inchworm piezo motor designs.

As an alternative to the use of inchworm piezo motor, step-motors, DC-motors with encoder, magnetic linear motors or hydraulic motors or others can be used. A suitable step-motor could be a step-motor having a step smaller than 1 degree, such as 0.72 degree.

The docking adapter of the hexapod is adapted to be locked into the counterpart adapter of the docking station.

When a hexapod is to be inserted into a docking station the free-arm robot positions the hexapod so that the docking adapter of the hexapod locks into the docking station. When the two adapters have locked, the free-arm robot releases its grip and retracts from the hexapod. Hereafter the docking station connects the power and data lines, and the hexapod is ready for use (hot pluck-in).

When a hexapod is to be removed from a docking station, the free-arm robot locks it's grip on the hexapod whereby the power and data lines to the hexapod are disconnected. When the free-arm robot pulls backwards, the hexapod docking adapter is released from the docking station adapter. The hexapod is thereby free to be inserted into another docking station.

Using the hexapod in combination with the computer vision systems and the telemetric systems is possible to move objects to a desired position with a high degree of precision. During movements, the computer vision and telemetric systems provide information to the motion planner regarding the position and orientation of the objects and on the tools used due to the position of the camera. This information is compared to information regarding the desired positions, and an eventual error may immediately be corrected by transmitting commands to the hexapod controller.

The feedback system is updated at very high frequencies. In a preferred embodiment, the update frequency of the telemetric system is app. 200 Hz, and the computer vision systems update the output at 25 Hz.

Figure 5:
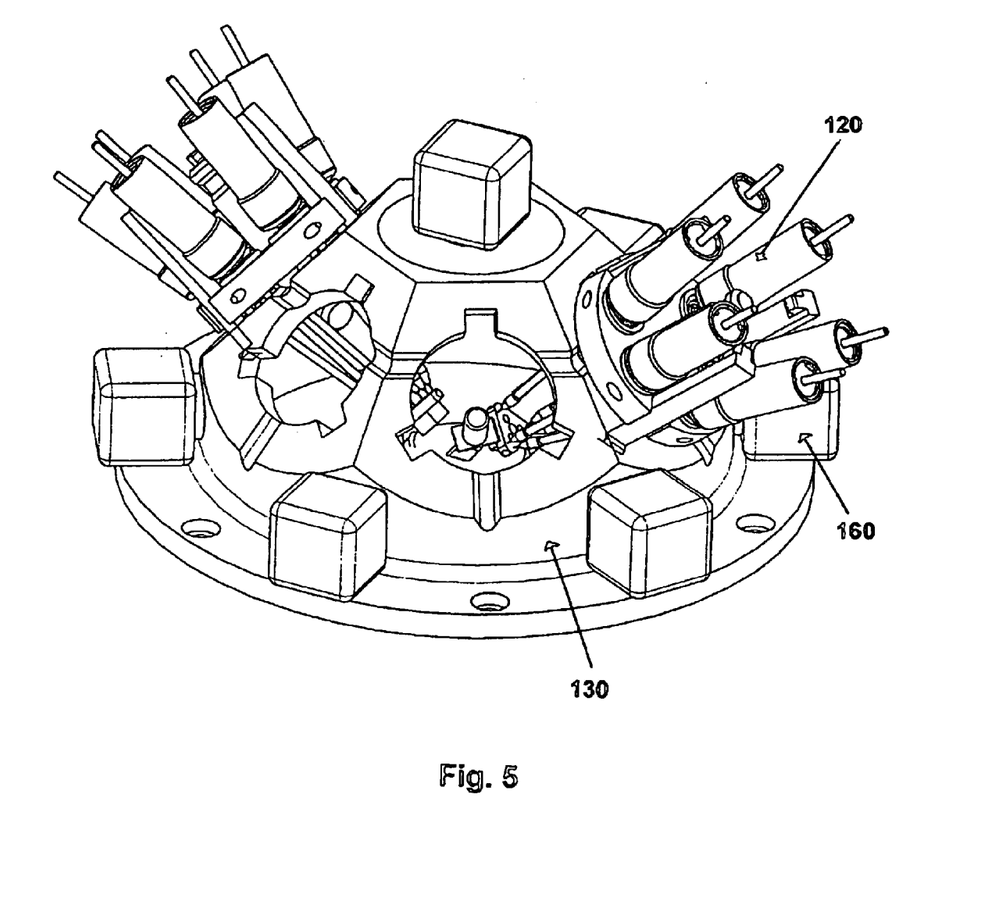
FIG. 5 shows the cube with docking stations and two hexapods positioned in a docking station.

The cube is the heart of the system and is placed at the centre of the system platform. The cube is shown in FIG. 5.

The cube is a very stable and stiff environment in which the hexapods may be positioned. The cube is constructed to remove any influence from the environment, e.g. electronic noise, vibrations from the environment and air borne (sound pressure), and temperature. When a hexapod is moved from one docking station to another, the movement is not very precise. This is not necessary, as the hexapod is not involved in any processes or assemblies. When the hexapod is positioned in a docking station in the cube, it is positioned in a very well defined and very stiff environment.

In the cube the assembly and processing is made.

The cube comprises

A floor adapted to hold one or more components or parts of the assembly. The floor may be a conveyer belt or similar adapted to transport small objects from outside the cube into the cube. The components may also be transported out of the cube again after use.

A number of docking stations for holding up an equal number of hexapods. Each docking station is positioned at an angle above the floor pointing towards the centre of the cube. The docking stations provide power supply and data lines to the main computer. In a preferred embodiment, the number of docking stations is six.

A video camera positioned at the top of the cube for surveillance and vision purposes.

A number of telemetric systems adapted to interact with the hexapods when present. Preferably, the number of hexapods and telemetric systems should be the same.

A number of inlets for providing laser light, glue or similar to the process taking place inside the cube.

A tool station for providing tools to be used in the assembly or process, which takes place inside the cube. The tool station could be a turntable with a number of different tools ready for being picked up by a hexapod.

The tools may comprise a pipette for dispensing glue or other fluid, drills, a light source with UV-light, etc. Furthermore, a variety of tools may be positioned together at a revolving tool-holder, this tool-holder being ready for being picked up by a hexapod.

The docking station is a station for holding a hexapod.

The docking station provides power supply to the hexapod as well as a data line to the main computer. Furthermore, it may provide a data line from the transmitting part of the telemetric system to the calculating part of the telemetric system.

The docking station is formed as an adapter suited to lock onto the counterpart adapter (docking adapter) on the hexapods.

When a hexapod is to be inserted into a docking station the free-arm robot positions the hexapod so that the docking adapter of the hexapod locks into the docking station. When the two parts have locked together, the free-arm robot releases it's grip and is retracted from the hexapod, the docking station connects the power and data lines, and hereafter the hexapod is ready for use (hot pluck-in).

When a hexapod is to be removed from a docking station, the free-arm robot locks it's grip on the hexapod whereby the power and data lines are disconnected. When the free-arm robot pulls backwards, the hexapod docking adapter is released from the docking station adapter. The hexapod is thereby free to be inserted into another docking station.

There are a number of telemetric systems in the system—one for each hexapod operating in the cube.

A telemetric system comprises three main parts.

The first part is positioned at the tip of the hexapods, and is called the transmitting part. The transmitting part comprise five optical transmitters positioned relative to each other as the dots on the "number 5" on a die, but with the modification that the centre dot is elevated relative to the other 4 dots.

The optical transmitters may be turned on and off in a predetermined sequence. Light Emitting Diodes (LED) may be used as optical transmitters, but in stead of LED's, optical fibres may be used for providing the light sources. Furthermore, the transmitting part comprises a small printed circuit board comprising a microprocessor and several data lines to the calculating part of the telemetric system. The transmitting part further comprises control for the optical transmitters. In case of using optical fibres as optical transmitters, LED's would be positioned on the transmitting part together with the other end of the optical fibre The second part is positioned at the cube, and is called the receiving part. This part comprises a beam splitter and two cylindrical lenses. Each of the lenses, positioned after the beam splitter, directs an image of the transmitting part towards two CCD-cameras, where an image is created. The first CCD-camera is rotated 90° in relation to the other. Alternatively, a two-dimensional CCD-camera may be used.

The third part is the calculating unit. The calculating unit controls the transmitting part by turning on and off the LED's in a predetermined sequence. It also controls the receiving part by acquiring images of the transmitting part with the LED's turned on. Using two sets of three images with each their LED turned on, the calculating unit is able to Determine the distance between the transmitter and receiver Determine three different angles of rotation of the transmitting part relative to the receiving part Determine a parallel shift in two directions of the transmitting part relative to the receiving part The amount of data generated by a telemetric system is rather large. Each set of data comprises six CCD line scans each comprising at least 2048 pixels. For each of these line scans, data must be analysed and information extracted. The information extracted must be combined with information from the other five line scans. The result is a set of co-ordinates defining the position and orientation of the transmitting part relative to the receiving part.

As the transmitting part is positioned at the tip of the hexapods, it is the position of the tip relative to the receiving part that may be determined using the telemetric system. The tip of the hexapod will usually hold a component or tool in a well-known manner, and the position and orientation of the component or tool may therefore be determined.

If the main computer of the system should receive the primary data from the CCD line scan cameras, it would be overloaded—especially if there is a large number of telemetric systems active. As the main computer only need the set of co-ordinates, the calculating unit is adapted to do the calculations. The output from the calculating unit is the set of co-ordinates.

The update frequency of the telemetric system may be up to several hundred Hertz.

In connection to each of the docking stations in the external workspace an additional telemetric system may be provided. This will promote safe and problem free handling of the components in the external workspace.

The main computer is preferably comprised by a high performance PC, as it has a large number of tasks to do. To relieve the main computer a number of low level processors are provided.

The main computer is the Graphical User Interface (GUI) to the user. This means that all information from the system to the user and vice-versa is handled by the main computer. Using the graphical interface new parts, processes and assemblies are defined, and these may be combined to designs. Designs may be simulated using the main computer, or they may be "run" by the system.

Running a design on the system comprise control of the free-arm robot, one or more hexapods, one or more telemetric systems, as well as one or more vision systems. Further, it comprises motion planning, so that the hexapods do not collide, and display on the GUI of the progress of the process.

When running a design, the computer receives information from the telemetric systems and the vision systems. Using this information, the computer then calculates the positions of the components in the cube as well as in the external workspace, and determines which actions to do next.

From the users point-of-view, the system may be divided into 3 modes.

Object mode. In this mode, objects, assemblies, and processes are defined using a Graphical User Interface (GUI). After definition, they are stored in a central database.

Design mode. Object, assemblies, and processes defined in the object mode may be combined into designs, which may be simulated in the computer and "run" by the Microbotic system.

Calibration mode. Mechanical configuration and calibration of the system. Mechanical configuration involves changing hexapod tools and other preparations. Calibration is essential for upholding the desired accuracy of the system and is only performed by an expert user.

The control of objects involves e.g. a number of hexapods, video cameras (vision systems) and telemetric systems as well as motion planning of the free-arm robot and hexapods. Another important task is to provide a GUI for the user of the system.

From the programmers point-of-view, the system may be divided into 3 layers.

User layer. The user layer provides the GUI of the system.

High level layer. The high level layer is to be considered as a kernel completely transparent to the user. It is centred on a database that comprises CAD models for work pieces and descriptions of how to process these.

Low level layer. The low-level layer is not part of the main computer as such. The low-level layer is provided by a number of systems taking care of one task only. The low-level tasks are e.g. the calculations made in the calculating part of the telemetric systems. The main computer system does however control the low-level layer as it sends commands to the layer and receives information from the layer.

A system capable of handling these demands is necessarily very complex. The software architecture is therefore divided into clearly separated parts, which are all open, expandable and easy to understand and maintain. The various system components interact with each other as outlined in FIG. 7.

In the external workspace there are six supply units for storage of components to be used inside the cube or assemblies that has been made inside the cube. Each of the six supply units is positioned adjacent to an external docking station. In combination to each of the docking stations there may be a telemetric system.

Each of the supply units comprises a number of containers for storage of a component. The supply unit is adapted to be rotated so as each of the containers in turn may come within reach of a hexapod locked into the docking station.

One or more of the supply units may be shared with other systems. Thereby it is possible to have a line of systems each performing one or more tasks on an assembly and passing the result on to the next system in the line.

DETAILED DESCRIPTION OF THE DRAWINGS

The present invention comprise a traditional free-arm robot, a number of hexapods for handling object, an internal workspace called the cube and an external workspace for storage of the small components before and after assembly.

Figure 1:
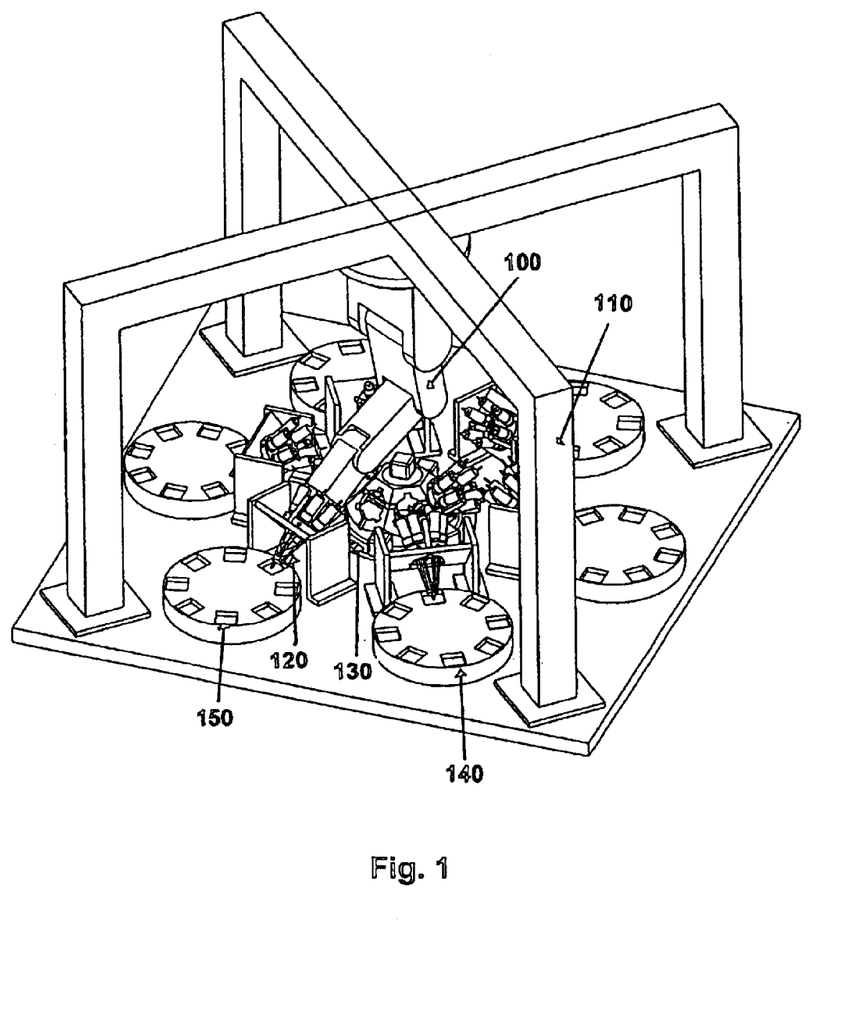
FIG. 1 shows a view of the present invention.

FIG. 1 is a view of the present invention showing the most important components. A free-arm robot 100 is positioned on a frame 110 above a cube 130. The free-arm robot may pick-up a hexapod 120 for positioning it either at the cube 130 or at an external workspace 140. The external workspace comprises storage 150 for small components used in the cube 130 or for components produced in the cube 130.

The cube constitutes a very stiff and rigid environment filtering influences from the environment to a very low level. The cube is shown in FIG. 5 together with two hexapods and five receiving parts of the telemetric systems.

A hexapod is a very flexible and stiff system where an object hold by the hexapod may be moved in three directions and rotated around three axes. It is possible to e.g. align two components in relation to each other and applying glue by using three hexapods in corporation.

In FIG. 1, the system comprises six hexapods, but another number could have been selected. It is not necessary that all hexapods are present in the system. Some of them could be obsolete for a specific task.

In the cube and at the extended workspace, a telemetric system is provided. The telemetric system provides information regarding the position and rotation of the components held by the hexapods.

A main computer controls the system. The computer determines the movements of the free-arm robot and the positions and movements of each of the hexapods. The main computer furthermore controls the interaction of two or more hexapods using information from the positioning system. Information regarding objects and processes is handled by the main computer in a CAD format, so that drawings and constructions may be imported from or exported to standard CAD systems.

The free-arm robot may be a standard or traditional robot with accuracy in the movements of a few $10^{th}$ of mm. It is positioned on a frame directly above the cube. The robot has at least three degrees of freedom. It may rotate 360 degrees at the base joint.

Figure 2:
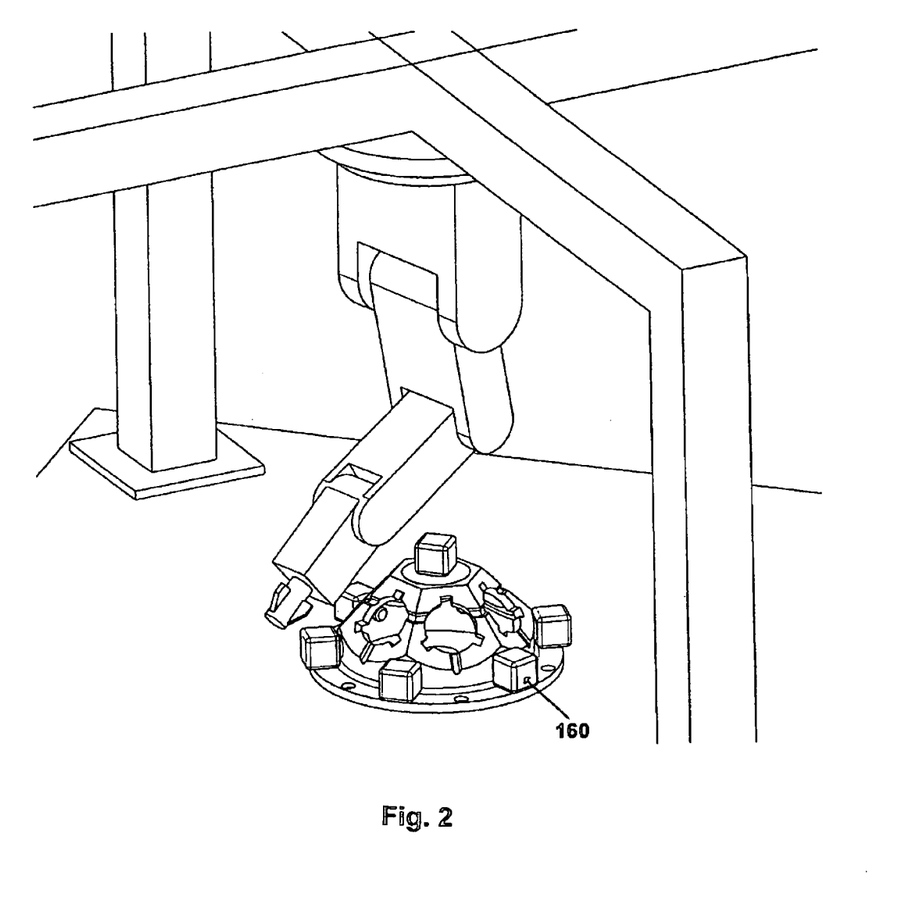
FIG. 2 shows the free-arm robot and the cube.
Figure 4:
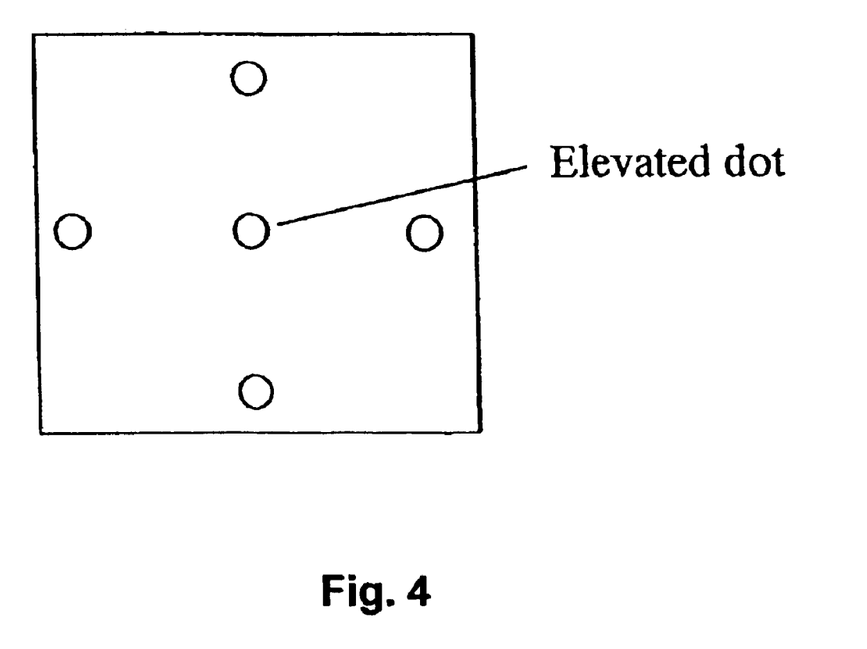
FIG. 4 shows the transmitting part of the telemetric systems.

The free-arm robot is used to move the hexapods from one docking station to another. The tip of the arm may be formed as an adapter suited to lock onto the counterpart adapter on the hexapods. When a hexapod is to be moved from one docking station to another, the robot moves the arm so that the adapter locks into the hexapod. By locking to the hexapod, the hexapod is at the same time released from the docking station. Hereafter the robot may move the hexapod out of the position in the docking station. The free-arm robot is shown in FIG. 2 together with the cube. There is no hexapod locked onto the free-arm adapter. The receiving part 160 of the telemetric system is also shown in FIG. 2, while a schematic view of the transmitting part of the telemetric system is shown in FIG. 4.

When the hexapod is moved by the robot, the power supply and the data lines are disconnected.

Figure 3:
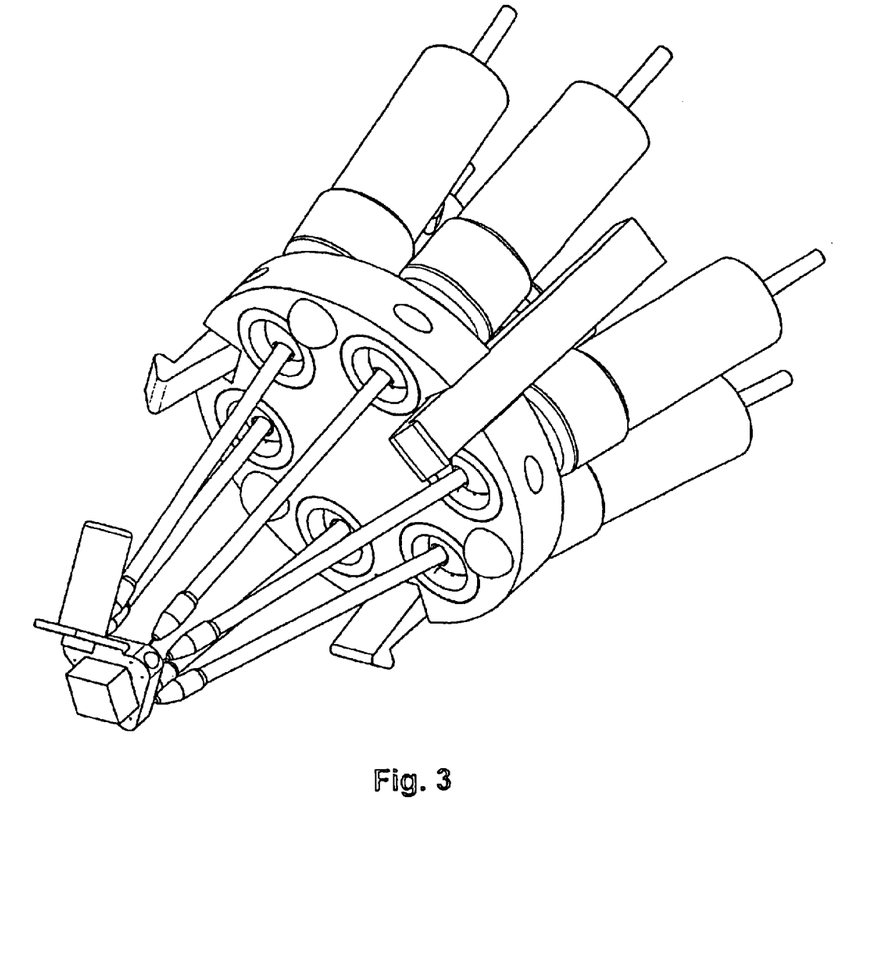
FIG. 3 shows the hexapod.

The hexapod is the workhorse in the system, and is shown in FIG. 3. The hexapod is a movable mechanical structure that fits into the docking stations. When positioned and locked in a docking station, the hexapod has a working space of 20×20×20 mm and may rotate the object ±20° in 3 axes within this area. Within the working space, the positioning accuracy will be better than 0.2 μm.

The transmitting part of the telemetric system is positioned at the front of the hexapod. The transmitting part comprise five optical transmitters positioned relative to each other as the dots on the "number 5" on a die, but with the modification that the centre dot is elevated relative to the other 4 dots.

Figure 6:
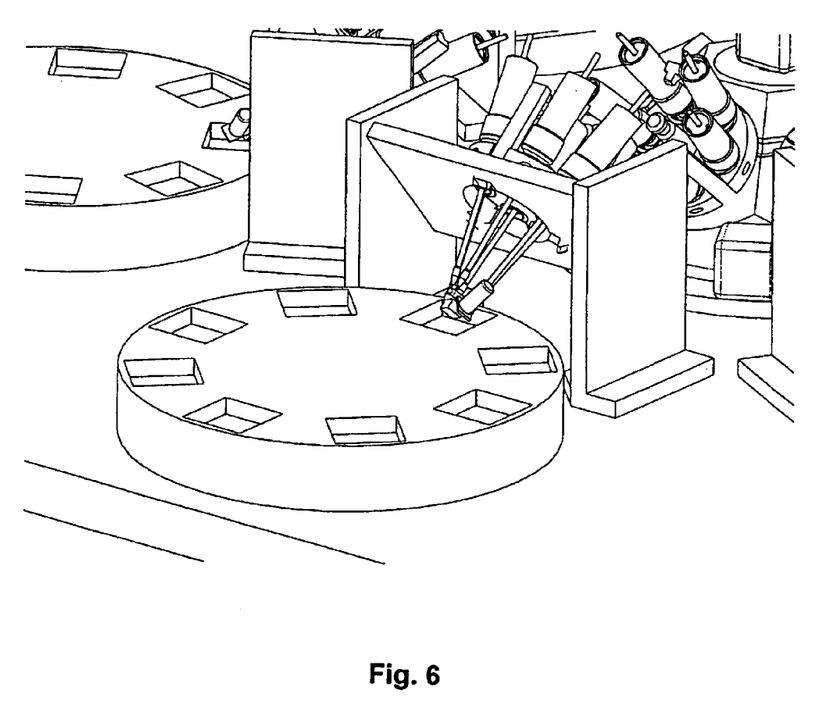
FIG. 6 shows the external works space with a hexapod positioned in the docking station.

The transmitting part comprises a small printed circuit board comprising a microprocessor and a data line to the calculating part of the telemetric system. The transmitting part further comprises control for the optical transmitters. The transmitters may be small LED's positioned directly at the front of the hexapod or they may be optical fibre ends. In the latter case, the LED's would be positioned on the printed circuit board together with the other end of the optical fibre In FIG. 6 an external workspace with a hexapod in the docking station is shown.

Figure 7:
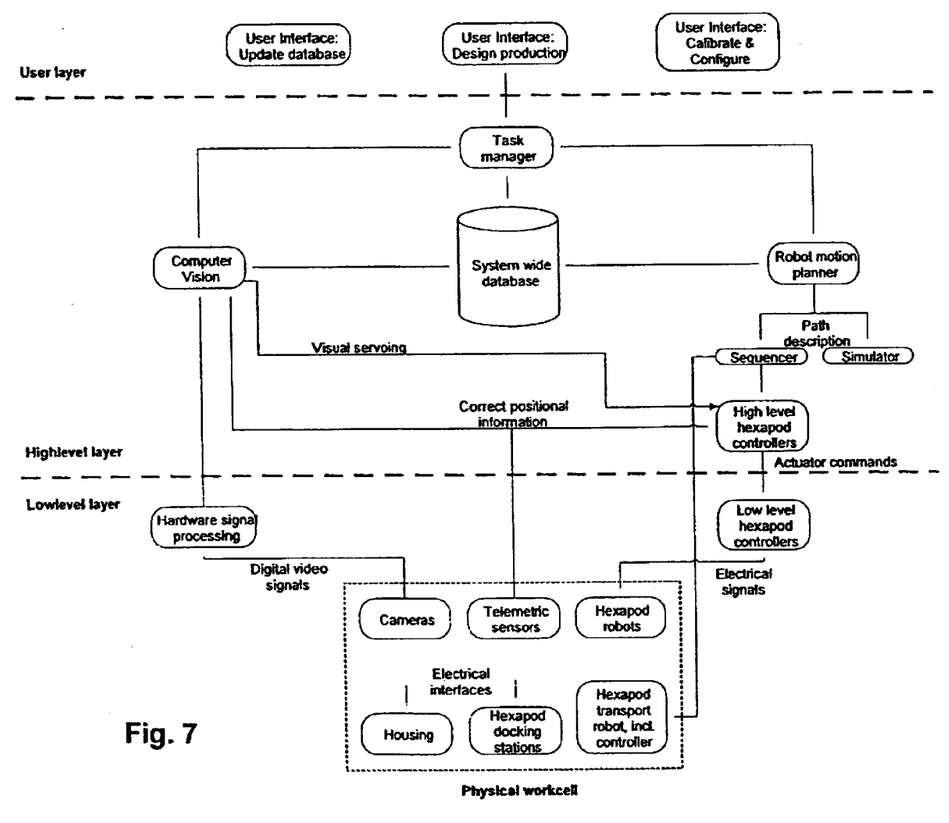
FIG. 7 shows a function diagram of the system software.

The diagram of the software part of the invention is shown in FIG. 7.

The user layer comprises three different modes to allow the user to interact with the robot platform:

Object mode: When a new project is started this mode is usually the first place of user interaction, as this is the mode used when adding new objects and processes to the central database.

Design mode: This mode is the main interface between the user and the platform and allows the user to compose the sequence of operations needed in a manufacturing process. Doing this involves three phases.

Design phase. In the design phase, the user defines the operation by piecing together objects and processes from the central database.

Simulation phase. When the design phase is completed, the system calculates and validates the robot motions needed to complete the operation. These motions are simulated and visualised in order to allow the user to correct possible errors. When the user is satisfied, the design may be "run" on the physical platform.

Execution phase. The execution may be monitored from the workstation via video feedback from the physical platform.

Calibration mode: The use of this mode allows a technician to access low level parameters and update embedded software packages as new versions are released.

The high level may be divided into several parts:

Task manager

System database

Vision system

Motion planning

The parts relating to the vision system are shown to the left in FIG. 7, and the parts relating to motion planning is shown to the right. The task manager ties these parts together and uses the system database for storing and retrieving object, assemblies, and processes.

The task manager controls the synchronising of the different parts of the system.

The Task manager may be divided into two parts. The overall task manager controlling the synchronising of the different parts of the system, and the task manager of the computer vision system.

The Task Manager controls the sequence of things to happen in the system. These tasks include:

Prompting the user for information required performing a task.

Sending commands to the other components (hexapods, vision systems, telemetric systems, etc.) either for requesting information or for initiating an action.

Requesting the motion planner to calculate the next movements of the hexapod or free-arm robot.

Storing or retrieving data from the database.

The system database comprises information regarding all components used in the system.

The information in the database comprise

Geometry of components in CAD format

CAD models of objects, processes and assemblies

Storage and assembly positions of components

Component interconnections—how do one component fit into another component

Movement—how to move a component from one location to another

Tools—where to get them and how to use them

Hexapod control—how to get a hexapod to move a component to the desired position Free-arm robot control—how to get the robot to move a hexapod from one docking station to another Due to the form of the information in the database, the data in the database is divided into three main categories:

Objects: The environment (e.g. the cube, the hexapods) and each object to be handled in the system are described by its geometry represented by a CAD—description.

Processes: A process is information regarding how two components fit together, how a screw is to handled, with what tool a task is to be done, etc.

Assemblies: Objects and processes may be combined with information regarding other objects and combinations thereof, as well as tools to be used in a process. These combinations are called assemblies. An assembly is therefore a combination of e.g. shape and orientation of a screw, information on the tools to handle the screw, as well as information regarding the hole in which the screw is to be positioned.

Figure 8:
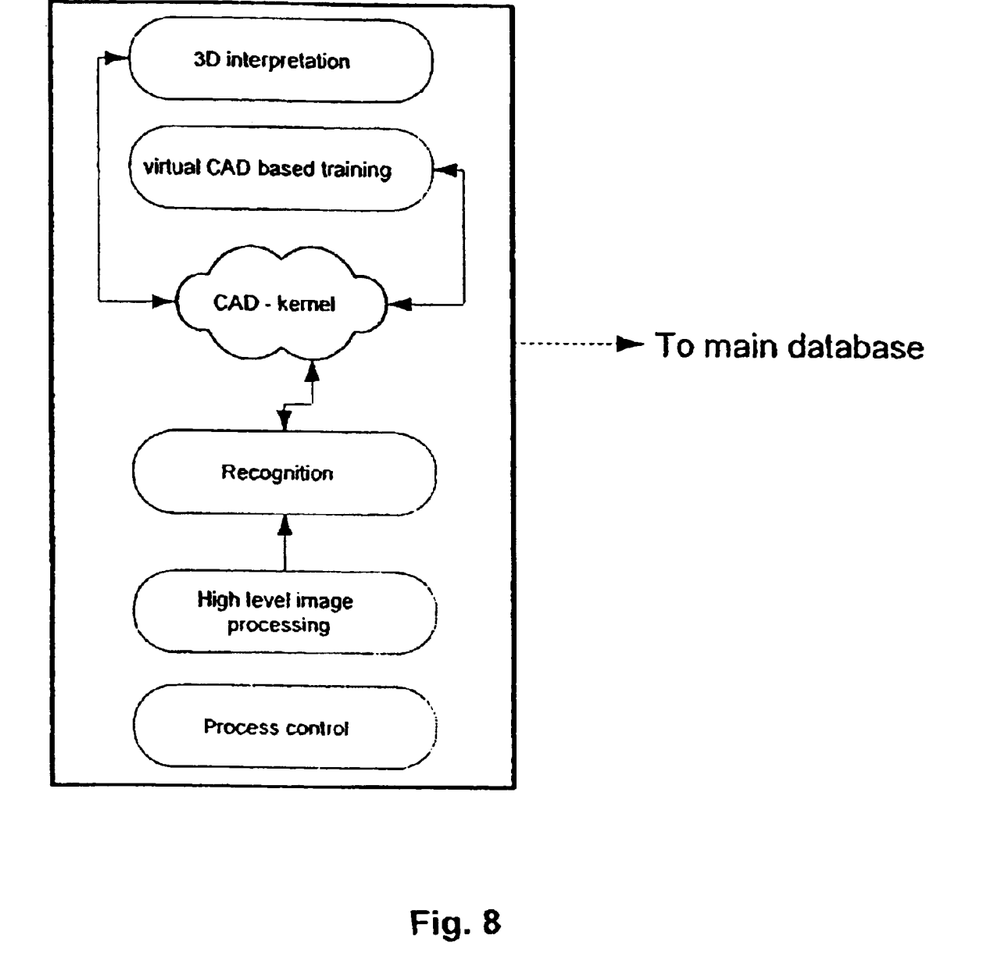
FIG. 8 shows a function diagram of the vision system.

The computer vision part of the systems, shown in a schematic view in FIG. 8, comprises a video camera positioned at the top of the cube and video cameras positioned at the tip of each of the hexapods. The cameras are adapted to provide images of the object, the tools and processes in the cube.

The image processing part of the computer vision may be divided into low-level data preparation and high level image processing.

The low-level data preparation comprises basic image enhancements such as threshold, edge detection, and colour enhancements.

The high level image processing comprises 2D image processing, 3D interpretation, calculation of position, and rotation of components, as well as comparing positions of objects and results of processing with CAD models.

High level image processing is closely connected to the system database, and during the progress of a design, images from the video cameras are used to confirm correct progress, or to adjust positions and movements of the components.

During the progress of a design, images acquired by the vision systems may be stored in the system database. The images are the base for a self-learning system, where the task manager may use the experience from previous runs of a design.

The basic components in the image processing part are shown in FIG. 8.

Robot motion planning is used when determining how one or more components are to be moved from one position to another. When only one component is to be moved, the planning is not very difficult, as it should only take into account the objects in the environments. If more than one component is moved from one position to another at the same time, it should be assured, that there will be no collisions.

Motion planning is an advanced technique defining a reverse gravitation field for each component. The reverse gravitation field means that the closer one gets to an object, the stronger is the repulsive force. When the hexapods are inserted into or retracted out of the cube and when the components are moved at the tip of the hexapod, the positions of every single component is well known. It is therefore also possible to calculate the combined gravitation field of the cube. If at any position the repulsive forces are getting to high, this means that two components are getting to close to each other. An upper limit may be set, forcing the main computer to try to move the components on another path.

At the same time, two components that are going to be joined or assembled may have attracting forces towards each other.

An assembly comprises information on all movements of all components in a CAD format. This makes it possible to simulate the design on screen, and thereby ensure no collisions.

In a simulation of an assembly, the positions and movements of components are ideal, but in the real world, the components will not do exactly as simulated. When moving the components in the cube, it is therefore necessary to measure the actual positions of the components and adjust the calculated (or theoretic) positions for the small errors of the real world.

In a preferred embodiment of the present invention, up to 11 hexapods may be in use at the same time. Six of these will be in the cube and the remaining five are positioned in the external workspace. All the active hexapods and the free-arm robot should be handled at the same time, making the Motion planning very complex.

By using the computer vision, the telemetric systems, and the system database, it is possible to determine the actual positions of the components in "real-time". In a preferred embodiment, the update frequency of the telemetric system is app. 200 Hz, and the computer vision systems update the output at 25 Hz. The actual positions of the components are then used for controlling the hexapods and free-arm robot to adjust the movements towards to desired positions.

The control of the hexapods and the free-arm robot may be divided into two parts. The first part is the high level part, where the desired and actual positions of the object are determined. The second part is the low-level part, where the determined adjustments are made.

When in design mode a design has been made, it is desired to simulate the design before actual execution in the cube. This may be done by replacing the low-level hexapod-control and the low-level free-arm control by a simulator. The simulator acts as if it was a hexapod or a free-arm, but it does not send instructions to the hardware.

The low-level layer comprises a number of different parts. Each of the parts has a printed circuit board and some embedded software. The software communicates with the high level layer, and handles instructions received from the high level layer. The software in the low-level layer may be replaced by simulator software when simulating a design.

The low-level software of the hexapods communicates with the high level software of the main computer system. As described earlier, the software receives commands from the main computer and executes these commands by making the hardware move forward, backward or similar.

The telemetric system comprises three parts—the transmitting part, the receiving part, and the calculating part. The calculating part is adapted to be a low-level layer of the system. This part is adapted to receive commands and requests from the high level layer. Depending on the received commands, the calculating part controls the transmitting part to turn on and off the light sources, and the receiving part to image data from the CCD-cameras The low level of the docking station provides information regarding presence of a hexapod in the station. Furthermore, it provides interface between the hexapod in the station and the high-level software system.

This low-level layer comprises basic image enhancements such as threshold, edge detection, and colour enhancements. When an image has been processed by the low-level layer, it is ready for the high level layer to determine position and orientation of components in the image.

What is claimed is:

1. A flexible tool for handling small objects, the tool comprising:

a free arm robot, at least one hexapod for handling small objects, an internal workspace for performing operations on small objects, and an external workspace for storing small objects during non-operation, said at least one hexapod(s) to engage with a small object and to move a small object between said internal workspace and said external workspace, and said free arm robot to move the at least one hexapod(s).

2. A flexible tool according to claim 1, wherein the internal workspace and the external workspace are arranged on a system platform, and wherein the internal workspace and the external workspace each comprises at least one docking station, each of said docking station(s) to accommodate a hexapod.

3. A flexible tool according to claim 2, wherein each hexapod comprises:

a docking adapter to be locked into a counterpart adapter of a docking station, and a free arm adapter being adapted to be locked into a counterpart adapter of the free arm robot.

4. A flexible tool according to claim 1, further comprising at least one supply unit for supplying objects to be handled in the internal workspace.

5. A flexible tool according to claim 1, wherein the hexapod(s) is/are operated by means of at least one motor, a linear motor being designed as an inchworm piezo motor, a step-motor, a DC-motor with encoder, a magnetic linear motor or a hydraulic motor.

6. A flexible tool according to claim 1, the tool comprising six hexapods.

7. A flexible tool according to claim 1, further comprising a telemetric system to interact with the hexapod(s), the telemetric system comprising a transmitting part, a receiving part, and a calculating unit.

8. A flexible tool according to claim 7, wherein the transmitting part of the telemetric system comprises at least one optical transmitter.

9. A flexible tool according to claim 7, wherein the receiving part of the telemetric system comprises at least one CCD camera.

10. A flexible tool according to claim 7, wherein the calculating unit of the telemetric system produces a set of co-ordinates defining the position and orientation of the transmitting part relative to the receiving part.

11. A flexible tool according to claim 7, wherein the calculating unit produces a feedback signal for the at least one hexapod(s), said at least one hexapod(s) being manipulated in accordance with said feedback signal.

12. A CAD environment comprising a flexible tool according to claim 1.

13. A CAD environment according to claim 12, wherein the flexible tool comprises six hexapods, and wherein the flexible tool further comprises a telemetric system to interact with the hexapods, the telemetric system comprising a transmitting part, a receiving part, and a calculating unit.

14. A flexible tool for handling small objects, the tool comprising:
- a conveyer belt,
- at least one hexapod for handling small objects,
- an internal workspace for performing operations on small objects, and
- an external area for holding small objects during non-operation,
- said conveyer belt to move a small object between said internal workspace and said external area and said at least one hexapod(s) to perform one or more operation (s) on said small object, when said small object is positioned within said internal workspace.

15. A flexible tool according to claim 14, wherein the hexapod(s) is/are operated by means of at least one motor, a linear motor being designed as an inchworm piezo motor, a step-motor, a DC-motor with encoder, a magnetic linear motor or a hydraulic motor.

16. A flexible tool according to claim 14, the tool comprising six hexapods.

17. A flexible tool according to claim 14, further comprising a telemetric system to interact with the hexapod(s), the telemetric system comprising a transmitting part, a receiving part, and a calculating unit.

18. A flexible tool according to claim 17, wherein the transmitting part of the telemetric system comprises at least one optical transmitter.

19. A flexible tool according to claim 17, wherein the receiving part of the telemetric system comprises at least one CCD camera.

20. A flexible tool according to claim 17, wherein the calculating unit of the telemetric system is to produce a set of co-ordinates defining the position and orientation of the transmitting part relative to the receiving part.

21. A flexible tool according to claim 17, wherein the calculating unit produces a feedback signal for the at least one hexapod(s), said at least one hexapod(s) being manipulated in accordance with said feedback signal.

22. A CAD environment comprising a flexible tool according to claim 14.

23. A CAD environment according to claim 22, wherein the flexible tool comprises six hexapods, and wherein the flexible tool further comprises a telemetric system to interact with the hexapods, the telemetric system comprising a transmitting part, a receiving part, and a calculating unit.

24. A method of handling small objects using a flexible tool, the method comprising the steps of:
- moving one or more small object(s) to be handled from an external workspace to an internal workspace of the flexible tool using one or more hexapod(s), performing operations on said small object(s) in the internal workspace using said hexapod(s).

25. A method according to claim 24, the flexible tool comprising a telemetric system comprising a transmitting part, a receiving part, and a calculating unit, the method further comprising the step of:
- defining, by means of the calculating unit, the position and orientation of the transmitting part relative to the receiving part.

26. A method according to claim 25, wherein the defining step comprises the step of determining the distance between the transmitting part and the receiving part.

27. A method according to claim 25, wherein the defining step comprises the step of determining three different angles of rotation of the transmitting part relative to the receiving part.

28. A method according to claim 25, wherein the defining step comprises the step of determining a parallel shift in two directions of the transmitting part relative to the receiving part.

29. A method according to claim 25, further comprising the step of:
- the calculating unit producing a feedback signal, manipulating the at least one hexapod(s) in accordance with said feedback signal.

30. A method according to claim 29, wherein the manipulating step is performed repeatedly as a substantially continuous correction to the operation of the hexapod(s).

31. A method according to claim 25, further comprising the step of running a design on the basis of information obtained via the telemetric system.

32. A method according to claim 31, the flexible tool comprising at least two hexapods, wherein the step of running a design is performed in such a way that collisions between different hexapods are avoided.

33. A method according to claim 32, wherein the step of running a design comprises the steps of:
- defining a reverse gravitation field for each hexapod in such a way that a repulsive force is experienced by a hexapod, said repulsive force increasing as the distance between said hexapod and another hexapod decreases, so as to prevent said two hexapods from colliding,
- defining a gravitation field for each hexapod holding an object which is going to be joined or assembled with another object, said gravitation field being defined in such a way that two hexapods holding objects which are going to be joined experience an attractive force, and
- calculating the combined gravitational field of the internal workspace.

* * * * *